United States Patent
Ono

(10) Patent No.: US 8,393,243 B2
(45) Date of Patent: *Mar. 12, 2013

(54) PARALLEL LINK MECHANISM AND INDUSTRIAL ROBOT

(75) Inventor: Masatoshi Ono, Suwa (JP)

(73) Assignee: Seiko Epson Corporation (JP)

( * ) Notice: Subject to any disclaimer, the term of this patent is extended or adjusted under 35 U.S.C. 154(b) by 255 days.

This patent is subject to a terminal disclaimer.

(21) Appl. No.: 12/793,019

(22) Filed: Jun. 3, 2010

(65) Prior Publication Data

US 2010/0236351 A1    Sep. 23, 2010

Related U.S. Application Data

(63) Continuation of application No. 11/581,741, filed on Oct. 16, 2006, now Pat. No. 7,752,939.

(30) Foreign Application Priority Data

Oct. 18, 2005    (JP) ................................. 2005-303416
Jun. 16, 2006    (JP) ................................. 2006-167510

(51) Int. Cl.
    *B25J 9/10*    (2006.01)
(52) U.S. Cl. .................. 74/490.03; 74/490.05; 414/680; 414/917; 901/15; 901/25
(58) Field of Classification Search ............... 74/490.03, 74/490.05, 490.07, 640; 414/680, 917; 901/15, 901/23, 24, 25
    See application file for complete search history.

(56) References Cited

U.S. PATENT DOCUMENTS

| | | | |
|---|---|---|---|
| 4,062,601 A | 12/1977 | Pardo et al. | |
| 4,096,766 A | 6/1978 | Pardo et al. | |
| 4,601,216 A | 7/1986 | Inoue et al. | |
| 4,742,729 A | 5/1988 | Cordara | |
| 4,784,014 A | 11/1988 | Bruns et al. | |
| 4,787,262 A | 11/1988 | Kozawa et al. | |
| 4,864,888 A | 9/1989 | Iwata | |
| 4,928,556 A | 5/1990 | Matsumoto et al. | |
| 4,955,250 A | 9/1990 | Fisher | |
| 5,042,322 A | 8/1991 | Hofmann | |
| 5,050,450 A | 9/1991 | Nakamura | |
| 5,054,332 A | 10/1991 | Terauchi et al. | |
| 5,222,409 A | 6/1993 | Dalakian | |
| 5,816,117 A | 10/1998 | Berry et al. | |
| 5,872,892 A | 2/1999 | Brown et al. | |
| 5,906,142 A | 5/1999 | Shirasawa | |

(Continued)

FOREIGN PATENT DOCUMENTS

| | | |
|---|---|---|
| DE | 38 90 561 | 7/1988 |
| EP | 1 671 756 | 6/2006 |

(Continued)

*Primary Examiner* — William C Joyce

(74) *Attorney, Agent, or Firm* — Harness, Dickey & Pierce, P.L.C.

(57) ABSTRACT

A link mechanism arranged between a fixed base and a movable base. The mechanism includes a drive gear reducer, a first arm, a second arm, a connection base, a first link, and a second link. The drive gear reducer includes a body, an input shaft, a first output shaft, and a second output shaft. The first arm is connected to the fixed base and the body of the reducer. The second arm is connected to the second output shaft and the movable base. The connection base is arranged such that the second arm is between the connection base and the reducer, the connection base is connected to the first output shaft. The first link is connected to the fixed base and the connection base. The second link is connected to the connection base and the movable base.

14 Claims, 5 Drawing Sheets

U.S. PATENT DOCUMENTS

| | | | |
|---|---|---|---|
| 6,817,267 B2 | 11/2004 | Kobayashi et al. | |
| 7,513,173 B2 * | 4/2009 | Ono | 74/490.03 |
| 7,752,939 B2 * | 7/2010 | Ono | 74/490.03 |
| 7,814,811 B2 | 10/2010 | Tanaka et al. | |
| 2001/0052735 A1 | 12/2001 | Sakamoto | |
| 2002/0007697 A1 | 1/2002 | Tanioka et al. | |
| 2002/0161481 A1 | 10/2002 | Uratani | |
| 2005/0087034 A1 | 4/2005 | Friedrich et al. | |

FOREIGN PATENT DOCUMENTS

| | | |
|---|---|---|
| JP | 59-121255 | 7/1984 |
| JP | 61-079586 | 4/1986 |
| JP | 62-213990 | 9/1987 |
| JP | 63-062934 | 3/1988 |
| JP | 63-229287 | 9/1988 |
| JP | 10-164797 | 6/1998 |
| JP | 10-166285 | 6/1998 |
| JP | 10-296680 | 11/1998 |
| JP | 2001-038656 | 2/2001 |
| JP | 2001-218422 | 8/2001 |
| JP | 2002-243000 | 8/2002 |
| JP | 2002-326181 | 11/2002 |
| JP | 2002-326182 | 11/2002 |
| JP | 2003-094376 | 4/2003 |
| JP | 2003-275980 | 9/2003 |
| JP | 2004-346960 | 12/2004 |
| JP | 2005-066762 | 3/2005 |
| JP | 2007-044840 | 2/2007 |
| JP | 4618252 | 11/2010 |
| SU | 1740826 | 6/1988 |
| WO | WO 01/26865 | 4/2001 |
| WO | WO 2006/022231 | 3/2006 |

* cited by examiner

PARALLEL LINK MECHANISM AND INDUSTRIAL ROBOT

CROSS-REFERENCE TO RELATED APPLICATIONS

This application is a continuation application of U.S. Ser. No. 11/581,741 filed Oct. 16, 2006 based upon and claims the benefit of priority from prior Japanese Patent Application No. 2005-303416, filed on Oct. 18, 2005 and Japanese Patent Application No. 2006-167510, filed on Jun. 16, 2006, the entire contents of which are incorporated herein by reference.

BACKGROUND

1. Technical Field

The present invention relates to a parallel link mechanism and an industrial robot.

2. Related Art

General requirements for industrial robots include increased operation speed, improved operation accuracy, and, in certain operation sites, enhanced cleanliness. There are demands that the industrial robots be used under particular circumstance involving use of specific gases or chemicals. One known vertical movement shaft mechanism of a SCARA robot includes a ball screw provided in a vertical movement shaft. The mechanism has a contractible and extensible bellows as a protecting member for preventing release of dust and leakage of grease from the interior of an arm to the external environment.

However, when the bellows extends and contracts, the pressure in the vertical movement shaft mechanism changes, inducing the dust release and the grease leakage. It is thus difficult for the vertical movement shaft mechanism having the bellows to maintain the increased cleanliness. Further, to sufficiently prolong mechanical life of the bellows of the vertical movement shaft mechanism, the bellows must be formed of material selected from a limited range. This makes it difficult to operate the vertical shaft mechanism having the bellows under the aforementioned particular circumstances.

To solve the problem, a vertical movement shaft mechanism of an industrial robot including a parallel link mechanism, but not a bellows, has been proposed. Specifically, as described in Japanese Laid-Open Patent Publication No. 2002-326181, the mechanism includes a first arm connected to a fixed base and a connection base and a second arm connected to the connection base and a movable base. A drive motor is provided in the fixed base and a plurality of spur gears are arranged in the connection base. The drive motor drives the spur gears through a reducer, causing the spur gears to transmit rotational force to the two arms. This vertically moves the movable base.

The vertical movement shaft mechanism of Japanese Laid-Open Patent Publication No. 2002-326181 operates without using a bellows, or is a bellows-less type. Instead, the mechanism includes a transmission mechanism employing the spur gears for rotating the two arms. It is thus necessary to engage the teeth of the spur gears together when assembling the industrial robot, which makes such assembly complicated.

SUMMARY

Accordingly, it is an objective of the present invention to provide a parallel link mechanism having a transmission mechanism easy to install and an industrial robot.

According to an aspect of the invention, a parallel link mechanism arranged between a fixed base and a movable base includes a harmonic drive gear reducer, a first arm, a second arm, a connection base, a first auxiliary link, and a second auxiliary link. The harmonic drive gear reducer has a body, an input shaft, a first output shaft, and a second output shaft. The first arm has a proximal end pivotally connected to the fixed base and a distal end connected to the body of the reducer. The second arm has a proximal end connected to the second output shaft and a distal end pivotally connected to the movable base. The connection base is arranged outside the second arm with respect to the reducer and connected to the first output shaft. The first auxiliary link is arranged parallel with the first arm and has an end pivotally connected to the fixed base and an end pivotally connected to the connection base. The second auxiliary link is arranged parallel with the second arm and has an end pivotally connected to the connection base and an end pivotally connected to the movable base.

According to a second aspect of the invention, a parallel link mechanism arranged between a fixed base and a movable base includes a harmonic drive gear reducer, a first arm, a second arm, a connection base, a first auxiliary link, and a second auxiliary link. The harmonic drive gear reducer has a body, an input shaft, a first output shaft, and a second output shaft. The first arm has a proximal end pivotally connected to the fixed base and a distal end connected to the second output shaft. The second arm has a proximal end connected to the body of the reducer and a distal end pivotally connected to the movable base. The connection base is arranged outside the first arm with respect to the reducer and connected to the first output shaft. The first auxiliary link is arranged parallel with the first arm and has an end pivotally connected to the fixed base and an end pivotally connected to the connection base. The second auxiliary link is arranged parallel with the second arm and has an end pivotally connected to the connection base and an end pivotally connected to the movable base.

According to a third aspect of the invention, an industrial robot includes a first parallel link mechanism, a second parallel link mechanism, and a harmonic drive gear mechanism. The first parallel link mechanism has a fixed base, a connection base, a first arm, and a first auxiliary link. The first arm has a proximal end pivotally connected to the fixed base. The first auxiliary link is arranged parallel with the first arm. The first auxiliary link has an end pivotally connected the fixed base and an end pivotally connected to the connection base. The second parallel link mechanism has the connection base, a movable base, a second arm, and a second auxiliary link. The second arm has a distal end pivotally connected to the movable base. The second auxiliary link is arranged parallel with the second arm. The second auxiliary link has an end pivotally connected to the connection base and an end pivotally connected to the movable base. The harmonic drive gear mechanism is arranged between the distal end of the first arm and the proximal end of the second arm. The harmonic drive gear mechanism includes a body, an input shaft, a first output shaft, and a second output shaft. The body is connected to the distal end of the first arm. The input shaft is connected to the drive motor. The first output shaft converts rotation of the input shaft and transmits the rotation to the connection base. The second output shaft converts rotation of the input shaft and transmits the rotation to the second arm.

According to a fourth aspect of the invention, an industrial robot includes a first parallel link mechanism, a second parallel link mechanism, and a harmonic drive gear mechanism. The first parallel link mechanism has a fixed base, a connection base, a first arm, and a first auxiliary link. The first arm has a proximal end pivotally connected to the fixed base. The first auxiliary link is arranged parallel with the first arm. The first auxiliary link has an end pivotally connected the fixed base and an end pivotally connected to the connection base. The second parallel link mechanism has the connection base, a movable base, a second arm, and a second auxiliary link. The second arm has a distal end pivotally connected to the movable base. The second auxiliary link is arranged parallel with the second arm. The second auxiliary link has an end pivotally connected to the connection base and an end pivotally connected to the movable base. The harmonic drive gear mechanism is arranged between the distal end of the first arm and the proximal end of the second arm. The harmonic drive gear mechanism includes a body, an input shaft, a first output shaft, and a second output shaft. The body is connected to the proximal end of the second arm. The input shaft is connected to a drive motor. The first output shaft converts rotation of the input shaft and transmits the rotation to the connection base. The second output shaft converts rotation of the input shaft and transmits the rotation to the first arm.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
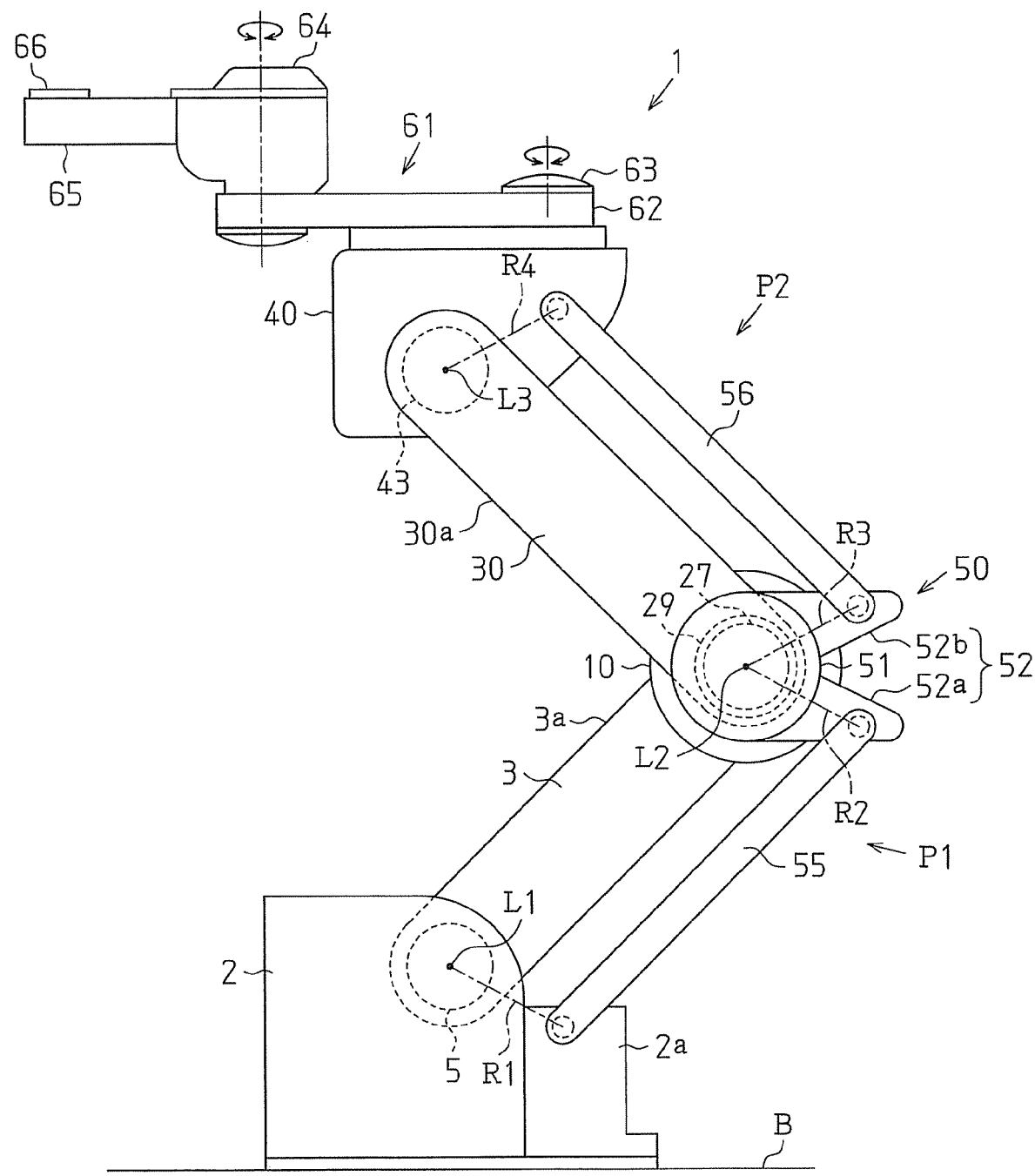
FIG. 1 is a side view showing an industrial robot according to an embodiment of the present invention.
Figure 2:
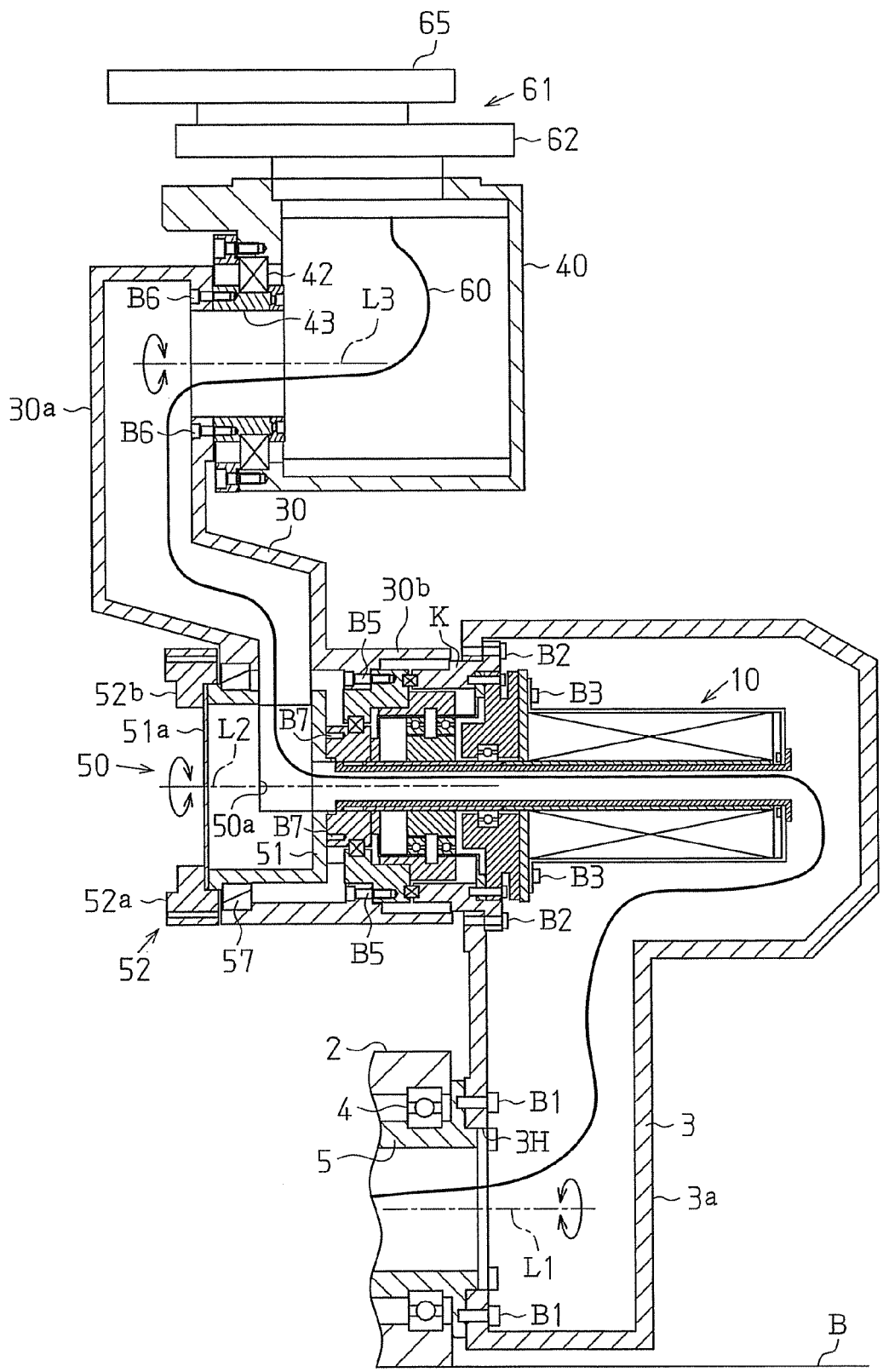
FIG. 2 is a cross-sectional view showing the industrial robot of FIG. 1.

An embodiment of the present invention will now be described with reference to FIGS. 1 to 4. FIG. 1 is a side view showing an industrial robot 1. FIG. 2 is a cross-sectional view showing the industrial robot 1.

As shown in FIG. 1, the industrial robot 1 has a substantially parallelepiped fixed base 2 fixed to a floor surface B. Referring to FIG. 2, the fixed base 2 has a cylindrical first connection shaft 5. The first connection shaft 5 is rotatably supported by the fixed base 2 through a bearing 4. The proximal portion of a first arm 3 is connected to the first connection shaft 5. Specifically, a through hole 3H is defined in the proximal portion of the first arm 3 and extends through the first arm 3, allowing communication between the interior and the exterior of the first arm 3. The first connection shaft 5 is secured to the wall of the through hole 3H through securing bolts B1. This permits the first arm 3 to rotate about the axis L1 of the first connection shaft 5. The connecting portion between the first connection shaft 5 and the first arm 3 is sealed by an O ring (not shown). The first arm 3 has a first arm cover 3a, which defines a sealed space in the interior of the first arm 3.

A drive motor 10 is provided at the distal end of the first arm 3.

Figure 3:
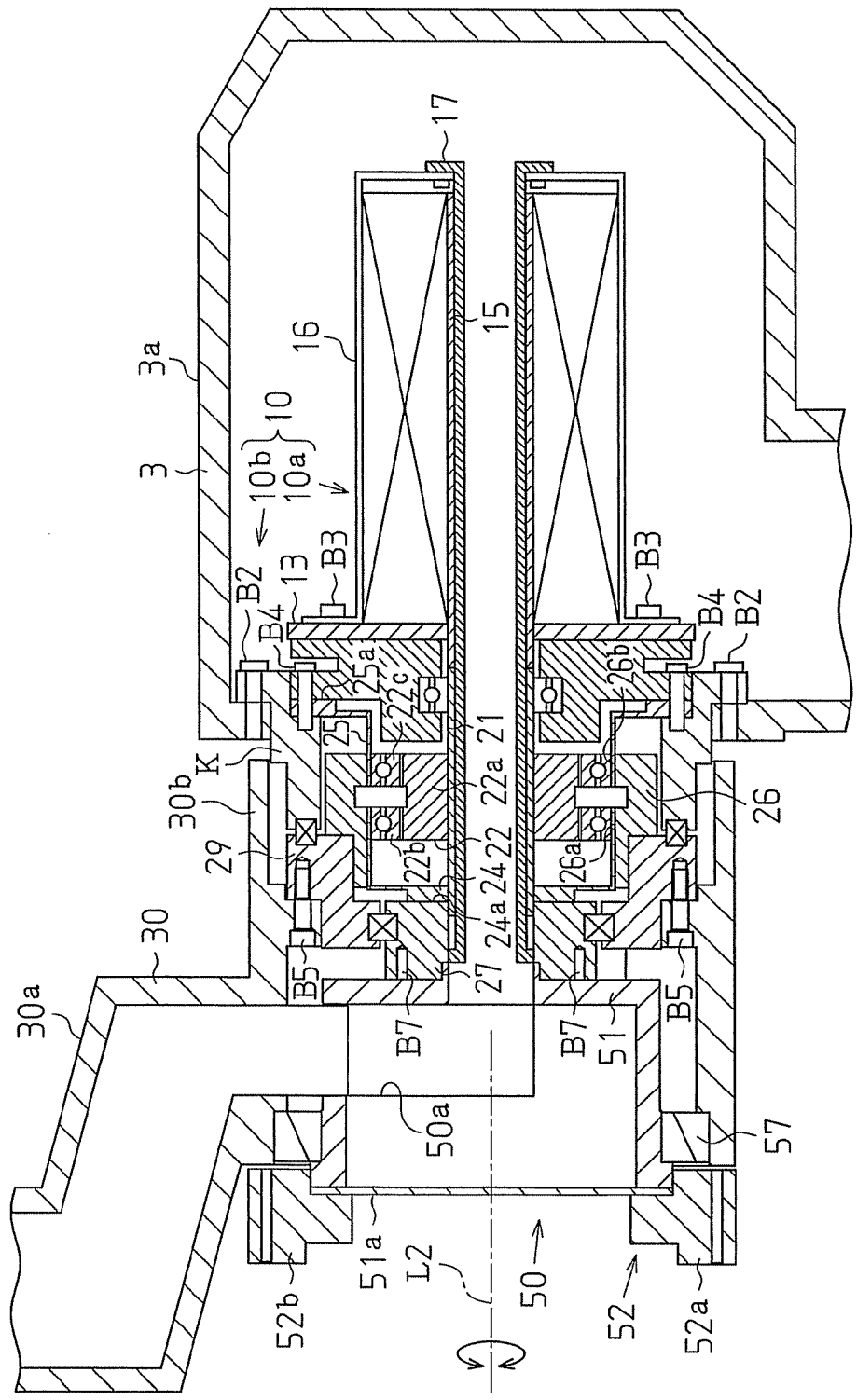
FIG. 3 is an enlarged cross-sectional view showing a drive motor including a harmonic drive gear reducer.

As shown in FIG. 3, the drive motor 10 includes a drive motor body 10a and the harmonic drive gear reducer 10b. The reducer 10b has a body, or a body cover K, fixed to the distal end of the first arm 3 through connection bolts B2. The drive motor body 10a is secured to the reducer 10b through a motor flange 13 by securing bolts B3. The drive motor body 10a has a cylindrical motor shaft 15. The motor shaft 15 projects toward the reducer 10b and is connected to an input shaft 21 of the reducer 10b. The motor shaft 15 is firmly connected to the input shaft 21 through, for example, a flange coupling in such a manner as to prevent the motor shaft 15 from becoming unstable with respect to the input shaft 21 in a rotational direction. The drive motor body 10a further includes a motor housing 16 secured to the motor flange 13 through the securing bolts B3. A sleeve 17 is secured to the motor housing 16. The sleeve 17 rotatably supports the motor shaft 15 and the input shaft 21 from inside the motor shaft 15 and the input shaft 21. The sleeve 17 defines a hollow space in the drive motor 10.

Rotational force generated by the motor shaft 15 is transmitted to the input shaft 21. The input shaft 21 has a wave generator 22. The wave generator 22 has a cam portion 22a having an oval cross-section, a first ball bearing 22b, and a second ball bearing 22c. The cam portion 22a is secured to the input shaft 21. The first and second ball bearings 22b, 22c are arranged around the outer circumference of the cam portion 22a. When the input shaft 21 rotates about the axis L2, the inner rings of the first and second ball bearings 22b, 22c rotate about the axis L2 integrally with the cam portion 22a.

A first flexspline 24 is formed around the outer ring of the first ball bearing 22b. The first flexspline 24 has a substantially cup-like shape. The first flexspline 24 has a cylindrical portion formed of an elastic metal body. The inner wall of the cylindrical portion is held in contact with the outer ring of the first ball bearing 22b. When the input shaft 21 (the cam portion 22a) rotates, a cross-section of the cylindrical portion of the first flexspline elastically deforms in an oval shape along the outer peripheral surface of the cam portion 22a. Teeth (not shown) are formed on the outer circumference of the cylindrical portion of the first flexspline 24. A first output shaft 27 is secured to a proximal portion 24a of the first flexspline 24 through a non-illustrated connection bolt. The first output shaft 27 is rotatably supported by the input shaft 21 and rotates about the axis L2.

A second flexspline 25 is formed around the outer ring of the second ball bearing 22c. The second flexspline 25 has a cylindrical portion formed of an elastic metal body and a flange portion 25a extending radially outward from an axial end of the cylindrical portion. The inner wall of the cylindrical portion is held in contact with the outer ring of the second ball bearing 22c. When the input shaft 21 (the cam portion 22a) rotates about the axis L2, a cross-section of the cylindrical portion of the second flexspline 25 elastically deforms in an oval shape along the outer peripheral surface of the cam portion 22a. Teeth (not shown) are formed on the outer peripheral surface of the cylindrical portion of the second flexspline 25. The flange 25a is secured to the cover K through securing bolts B4.

A cylindrical circular spline 26 is arranged around the first and second flexsplines 24, 25. A second output shaft 29 is connected to an outer side of the circular spline 26 through a non-illustrated connection bolt. The second output shaft 29 is rotatably supported by the first output shaft 27 through a bearing arranged at an outer side of the first output shaft 27. When the circular spline rotates, the second output shaft 29 rotates about the axis L2.

A first gear portion 26a and a second gear portion 26b are formed at the inner circumference of the circular spline 26 and engaged with the first flexspline 24 and the second flexspline 25, respectively. The first gear portion 26a has a greater number of teeth than the first flexspline 24. The first gear portion 26a becomes engaged with the first flexspline 24 solely in a direction defined by the longitudinal axis, of the oval cam portion 22a. The second gear portion 26b has a greater number of teeth than the second flexspline 25. The second gear portion 26b becomes engaged with the second flexspline 25 solely in a direction defined by the longitudinal axis of the cam portion 22a.

In a single cycle of clockwise rotation of the input shaft 21, each of the teeth of the first gear portion 26a relatively rotates the engaged one of the teeth of the first flexspline 24 in a counterclockwise direction by an amount corresponding to the difference between the number of the teeth of the first gear portion 26a and the number of the first flexspline 24. In other words, when the input shaft 21 rotates, the circular spline 26 rotates the first output shaft 27 relative to the first flexspline 24 in the direction opposite to the rotational direction of the input shaft 21. The circular spline 26 rotates the first output shaft 27 in accordance with the reduction ratio corresponding to the difference between the number of the teeth of the first gear portion 26a and the number of the teeth of the first flexspline 24.

In a single cycle of clockwise rotation of the input shaft 21, each of the teeth of the second gear portion 26b relatively rotates the engaged one of the teeth of the second flexspline 25 in a counterclockwise direction by the amount corresponding to the difference between the number of the teeth of the second gear portion 26b and the number of the teeth of the second flexspline 25. In other words, when the input shaft 21 rotates, the circular spline 26 rotates the second output shaft 29 relative to the second flexspline (the first arm 3) in the direction opposite to the rotational direction of the input shaft 21. The circular spline 26 rotates the second output shaft 29 in accordance with the reduction ratio corresponding to the difference between the number of the teeth of the second gear portion 26b and the number of the teeth of the second flexspline 25.

That is, the first output shaft 27 receives rotation of the input shaft 21 that has been converted into rotation in the opposite direction and reduced by the first flexspline 24 and the first gear portion 26a of the circular spline 26. Similarly, the second output shaft 29 receives rotation of the input shaft 21 that has been converted into rotation in the opposite direction and reduced by the second flexspline 25 and the second gear portion 26b of the circular spline 26.

The ratio of the reduction ratio of the first output shaft 27 to the input shaft 21 to the reduction ratio of the second output shaft 29 to the input shaft 21 can be varied by changing the number of the teeth of each of the first and second flexsplines 24, 25 and the first and second gear portions 26a, 26b. In the illustrated embodiment, the number of the teeth of each of these components is selected so that the ratio of the reduction ratio of the first output shaft 27 to the input shaft 21 and the reduction ratio of the second output shaft 29 to the input shaft 21 become 2:1. In other words, the second output shaft 29 of the illustrated embodiment rotates in the same direction as that of the first output shaft 27 at a rotational angle twice as large as that of the first output shaft 27.

The lower end of the second arm 30 is connected to the second output shaft 29. Specifically, a cylindrical portion 30b formed in the lower end of the second arm 30 is secured to the second output shaft 29 through connection bolts B5 in such a manner that the cylindrical portion encompasses the outer circumference of the second output shaft 29. Referring to FIG. 2, a movable base 40 having a substantially box-like shape is connected to the upper end of the second arm 30. The movable base 40 has a cylindrical second connection shaft 43 rotatably supported by a bearing 42. The upper end of the second arm 30 is secured to the second connection shaft 43 through securing bolts B6. The second arm 30 is rotatably connected to the movable base 40 and rotates about the axis L3 of the second connection shaft 43. The second arm 30 and the second connection shaft 43 are both hollow. The second arm 30 is sealed by a second arm cover 30a and the connecting portion between the second connection shaft 43 and the second arm 30 is sealed by an O-ring (not shown).

As shown in FIG. 3, a connection base 50 is arranged outside the second arm 30 with respect to the reducer 10b (at the left-hand side as viewed in FIG. 2) and secured to the first output shaft 27. The connection base has a cup-like connecting portion 51 and an extended portion 52 secured to the connecting portion 51. The connecting portion 51 is fixed to the first output shaft 27 through connection bolts B7. The connecting portion 51 has a connecting portion cover 51a and a seal member 57. The connecting portion cover 51a and the seal member 57 seal the space between the connection base 50 and the second arm 30 in such a manner as to permit the connection base 50 and the second arm 30 to slide on each other. The connecting portion 51 forms a communicating portion 50a that allows communication between the interior of the drive motor 10 and the interior of the second arm 30.

Specifically, with reference to FIG. 2, the industrial robot 1 has a space (a passage) extending along a path from the fixed base 2 to the movable base 40 through the first connection shaft 5, the first arm 3, the reducer 10b, the sleeve 17, the communicating portion 50a, the second arm 30, and the second connection shaft 43. A wiring tube 60 extends from the fixed base 2 to the movable base 40 along the path defined by the space (the passage). The proximal end of the wiring tube 60 is connected to a wiring substrate or a valve (neither is shown) accommodated in an accommodation box provided in the fixed base 2.

As shown in FIG. 1, the extended portion 52 has a lower extended piece 52a and an upper extended piece 52b. The upper end of a first auxiliary link 55 is rotatably connected to the lower extended piece 52a. The lower end of the first auxiliary link 55 is rotatably connected to an extended frame portion 2a of the fixed base 2. In the illustrated embodiment, a first parallel line R1 is the line extending from the lower connection point of the first arm 3 to the lower connection point of the first auxiliary link 55. A second parallel line R2 is the line extending from the upper connection point of the first arm 3 to the upper connection point of the first auxiliary link 55 The first arm 3, the first auxiliary link 55, the first parallel line R1, and the second parallel line R2 each correspond to one of the sides of a parallelogram. Further, the first arm 3, the first auxiliary link 55, the fixed base 2, and the connection base 50 form a first parallel link mechanism P1 having the fixed (immobile) first parallel line R1.

The lower end of a second auxiliary link 56 is rotatably connected to the upper extended piece 52b. The upper end of the second auxiliary link 56 is rotatably connected to the movable base 40. In the illustrated embodiment, a third parallel line R3 is the line extending from the lower connection point of the second arm 30 to the lower connection point of the second auxiliary link 56. A fourth parallel line R4 is the line extending from the upper connection point of the second arm 30 to the upper connection point of the second auxiliary link 56. The second arm 30, the second auxiliary link 56, the third parallel line R3, and the fourth parallel line R4 each correspond to one of the sides of a parallelogram. Further, the second arm 30, the second auxiliary link 56, the connection base 50, and the movable base 40 form a second parallel link mechanism P2.

A robot arm mechanism 61 is provided on the movable base 40. The robot arm mechanism 61 has a first horizontal arm 62, a first joint shaft 63, a second joint shaft 64, and a second horizontal arm 65. The first horizontal arm 62 rotates about the first joint shaft 63, which is provided at the proximal end of the first horizontal arm 62. The second joint shaft 64 and the second horizontal arm 65 are arranged at the distal end of the first horizontal arm 62. The second horizontal arm 65 rotates about the second joint shaft 64, which is provided at the proximal end of the second horizontal arm 65. An operation shaft 66 is rotatably supported by the distal end of the second horizontal arm 65. An end effecter such as a hand device (not shown) is secured to the operation shaft 66.

Operation of the industrial robot 1 will hereafter be explained.

Figure 4:
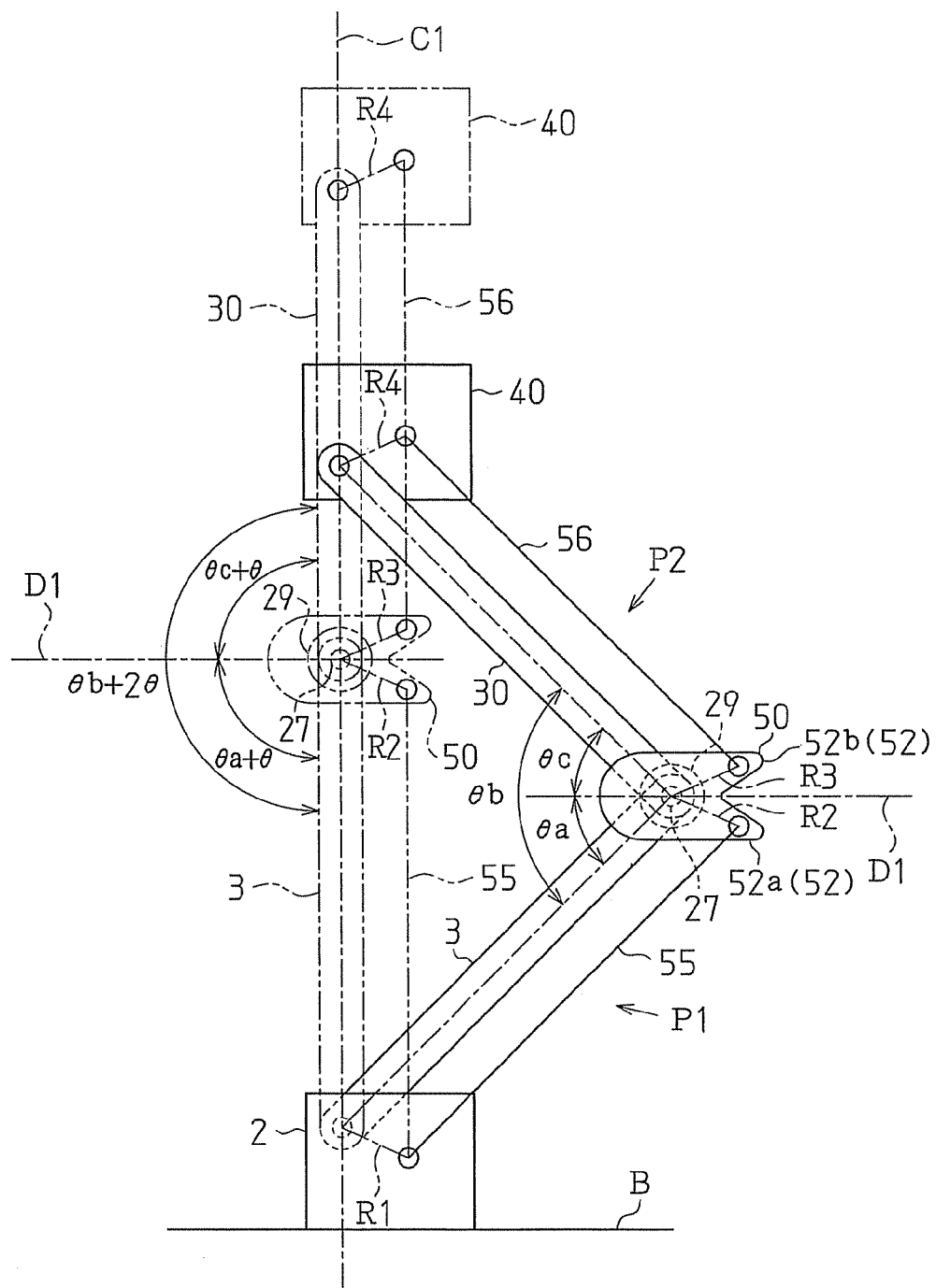
FIG. 4 is a diagram representing operation of the industrial robot of FIG. 1.

Specifically, as shown in FIG. 4, operation of the industrial robot 1 when the movable base 40 moves from the position indicated by the sold lines to the position indicated by the chain double-dashed lines will be described.

First, to pivot the first arm 3 and the second arm 30, the drive motor body 10a is actuated to rotate the input shaft 21 of the reducer 10b in a counterclockwise direction. This causes the first output shaft 27 to rotate in a clockwise direction, the opposite direction of the rotational direction of the input shaft 21, through the first flexspline 24 and the first gear portion 26a of the circular spline 26. The first output shaft 27 adjusts the angle θa of the first arm 3 with respect to the horizontal line D1 through rotation.

The second output shaft 29 rotates in the clockwise direction, the opposite direction of the rotational direction of the input shaft 21, through the second flexspline 25 and the second gear portion 26b of the circular spline 26. The second output shaft 29 adjusts the angle θb between the first arm 3 and the second arm 30 through rotation.

When the first output shaft 27 rotates in the clockwise direction, the first parallel link mechanism P1 maintains the second parallel line R2 in a state parallel with the first parallel line R1. In other words, the first parallel link mechanism P1 pivots the first arm 3 and the first auxiliary link 55 while maintaining the horizontal line D1 passing through the connection base 50 parallel with the floor surface B. In this manner, the connection base 50 is moved from the position indicated by the solid lines to the position indicated by the double-dotted broke lines as in FIG. 4.

When the first output shaft 27 rotates in the clockwise direction, the second output shaft 29 rotates in the clockwise direction (the same direction as the rotational direction of the first output shaft 27) at a rotational angle twice as large as that of the first output shaft 27. That is, when the angle θa increases by an amount corresponding to the rotational angle θ, the second output shaft 29 increases the angle θb by an amount corresponding to a value twice as large as the rotational angle θ and the angle θc by an amount corresponding to the rotational angle θ. As a result, the second output shaft 29 maintains the angles θa, θc as equal values.

When the first output shaft 27 rotates in the clockwise direction, the second parallel link mechanism P2 maintains the fourth parallel line R4 in a state parallel with the third parallel line R3. Specifically, the second parallel link mechanism P2 pivots the second arm 30 and the second auxiliary link 56 while holding the movable base 40 in a horizontal state. In this manner, the movable base 40 is raised from the position indicated by the solid lines on the vertical line C1 to the position indicted by the chain double-dashed lines on the vertical line C1, as in FIG. 4.

Contrary, to lower the movable base 40 from the position indicated by the chain double-dashed lines to the position indicated by the solid lined, the input shaft 21 of the reducer 10b is rotated in the clockwise direction.

The illustrated embodiment has the following advantages.

The one-input two-output spur gear reducer 10b, or the harmonic drive gear reducer 10b having the single input shaft 21 and the two output shafts 27, 29, is employed as a transmission mechanism. Therefore, by rotating the input shaft 21 through actuation of the drive motor body 10a, the first output shaft 27 (the first arm 3) and the second output shaft 29 (the second arm 30) can be rotated. That is, pivot of the first arm 3 and rotation of the second arm 30 can be achieved simply by securing the connection base 50 and the second arm 30 to the first output shaft 27 and the second output shaft 29, respectively, of the reducer 10b, which has been designed in advance. This makes it unnecessary to engage the teeth of the corresponding gears or arrange the motor axis and the rotational axis of each arm in such a manner that the axes coincide with each other, when assembling the robot 1. Assembly of the robot 1 is thus facilitated.

The fixed base 2, the first connection shaft 5, the first arm 3, the drive motor 10, the communicating portion 50a of the connection base 50, the second arm 30, the second connection shaft 43, and the movable base 40 are all hollow. This provides the space (the passage) extending from the fixed base 2 to the movable base 40, allowing arrangement of the wiring tube 60 of the robot arm mechanism and wires of the drive motor body 10a through the interior of the arms 3, 30 and the drive motor 10. The wiring tube 60 is thus prevented from being exposed to the exterior and interfering with the parallel link mechanisms (the first and second parallel link mechanisms P1, P2) and the robot arm mechanism 61.

The axis of the first output shaft 27 and the axis of the second output shaft 29 are arranged on one line. Further, the first output shaft 27 and the second output shaft 29 are arranged in such a manner as to axially overlap each other. This reduces the axial dimension of the reducer 10b. The size of the transmission mechanism thus becomes smaller compared to a case where a spur gear is used.

The connection base 50 is arranged outside the second arm 30 with respect to the reducer 10b (at the left-hand side as viewed in FIG. 2). Specifically, the connection base 50 is provided outside the second arm 30 with respect to the reducer 10b at a position corresponding to a side of the second arm 30 opposed to the side corresponding to the first arm 3. This enables accurate transmission of the output from the reducer 10b to the connection base 50 and the second arm 30, widening the range from which the output of the reducer 10b (the reduction ratio) is selected.

The first arm 3, the second arm 30, and the connecting portion 51 are sealed by the first arm cover 3a, the second arm cover 30a, and the connecting portion cover 51a, respectively. Further, the connecting portion between the first arm 3 and the first connection shaft 5, the connecting portion between the second arm 30 and the second connection shaft 43, the space between the connection base 50 and the second arm 30 are sealed by an O-ring or the seal member 57. This structure improves seal performance of the industrial robot 1, suppressing dust release or grease leakage from the interior of the arms 3, 30 to the exterior. The robot 1 thus can be operated under specific circumstances such as a clean environment.

The illustrated embodiment may be modified in the following forms.

The sleeve 17 of the drive motor body 10a may be omitted.

The first connection shaft 5, the first arm 3, the communicating portion 50a of the connection base 50, the second arm 30, and the second connection shaft 43 do not necessarily have to be hollow.

Instead of providing the drive motor 10 having an integral reducer 10b, the reducer 10b and the drive motor body 10a may be arranged separately from each other. In this case, for example, the drive motor body 10a may be fixed to the fixed base 2.

The ratio of the reduction ratio of the first output shaft 27 to the input shaft 21 to the reduction ratio of the second output shaft 29 to the input shaft 21 is not particularly restricted to 2:1, but may be altered to any other suitable values.

The first output shaft 27 and the second output shaft 29 do not necessarily have to axially overlap each other.

Figure 5:
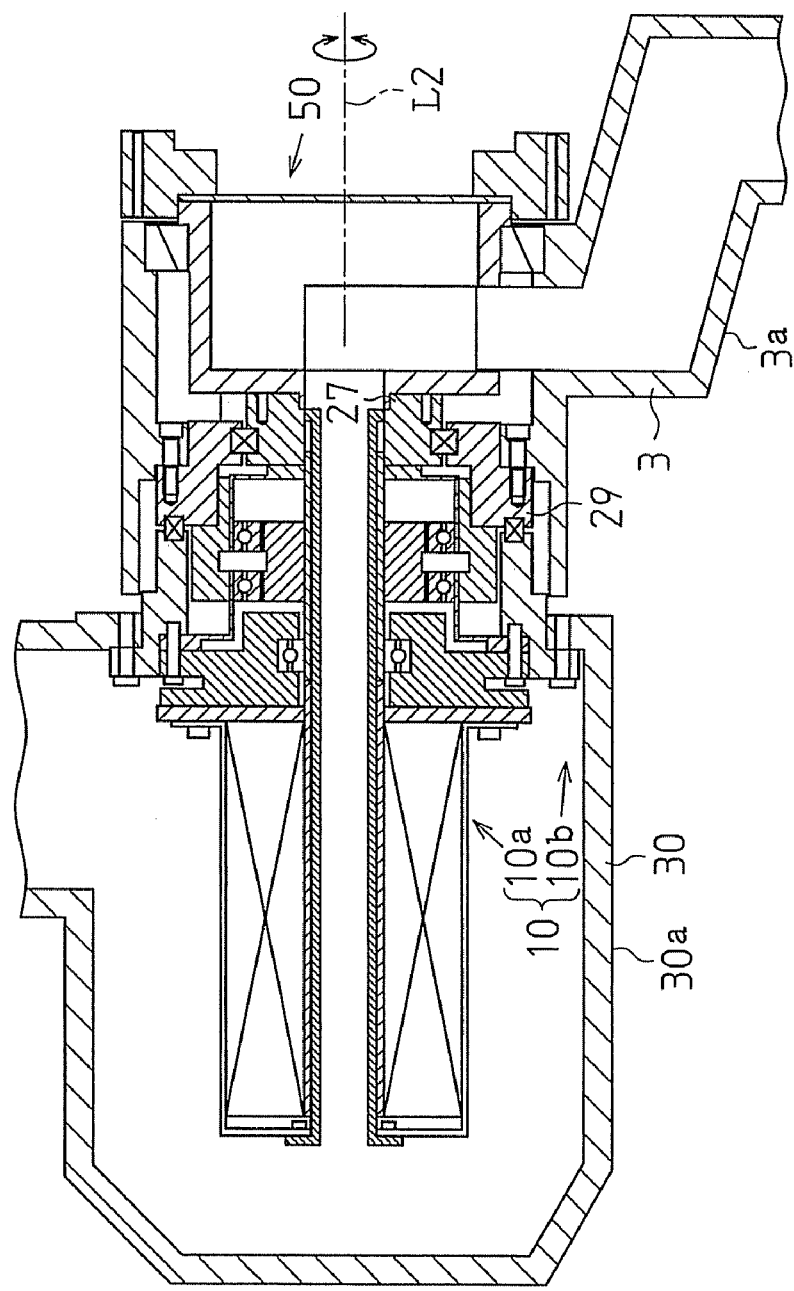
FIG. 5 is an enlarged cross-sectional view showing another example of the drive motor of FIG. 3.

In FIG. 5, unlike the embodiment of FIG. 3, the drive motor 10 is secured to the proximal end of a second arm 30, not the distal end of a first arm 3. The distal end of the first arm 3 is connected to the second output shaft 29 of the reducer 10b. The connection base 50 is connected to the first output shaft 27. In this case, it is preferred that the connection base 50 be arranged outside the first arm 3 with respect to the reducer 10b. More specifically, it is preferred that the connection base 50 be located outside the first arm 3 with respect to the reducer 10b at a position corresponding to a side of the first arm 3 opposed to the side corresponding to the second arm 30.

The first parallel link mechanism P1 and the second parallel link mechanism P2 may be arranged horizontally.

Therefore, the present examples and embodiments are to be considered as illustrative and not restrictive and the invention is not to be limited to the details given herein, but may be modified within the scope and equivalence of the appended claims.

What is claimed is:

1. A link mechanism arranged between a fixed base and a movable base, the mechanism comprising:
   a harmonic drive gear reducer including a body, an input shaft, a first output shaft, and a second output shaft;
   a first arm connected to both of the fixed base and the body of the reducer;
   a second arm connected to both of the second output shaft and the movable base;
   a connection base arranged such that the second arm is between the connection base and the reducer, the connection base is connected to the first output shaft;
   a first link connected to both of the fixed base and the connection base; and
   a second link connected to both of the connection base and the movable base.

2. The mechanism according to claim 1, wherein the first output shaft and the second output shaft axially overlap each other.

3. The mechanism according to claim 1, wherein the ratio of a reduction ratio of the first output shaft to the input shaft to a reduction ratio of the second output shaft to the input shaft is 2:1.

4. The mechanism according to claim 1, wherein the reducer is integral with a motor operable to drive the input shaft.

5. The mechanism according to claim 4,
   wherein the first arm and the second arm are hollow;
   wherein the drive motor is hollow;
   wherein the connection base has a hollow communicating portion that allows communication between a hollow portion of the drive motor and a hollow portion of the second arm; and
   wherein the first arm, the second arm, the drive motor, and the connection base define a continuous hollow passage.

6. A link mechanism arranged between a fixed base and a movable base, the mechanism comprising:
   a harmonic drive gear reducer including a body, an input shaft, a first output shaft, and a second output shaft;
   a first arm connected to the fixed base and the second output shaft;
   a second arm connected to the body of the reducer and the movable base;
   a connection base positioned such that the first arm is between the connection base and the reducer, the connection base is connected to the first output shaft;
   a first link connected to the fixed base and the connection base; and
   a second link connected to the connection base and the movable base.

7. The mechanism according to claim 6, wherein the first output shaft and the second output shaft axially overlap.

8. The mechanism according to claim 6, wherein the ratio of a reduction ratio of the first output shaft to the input shaft to a reduction ratio of the second output shaft to the input shaft is 2:1.

9. The mechanism according to claim 6, wherein the reducer is integral with a drive motor that drives the input shaft.

10. The mechanism according to claim 9,
    wherein the first arm and the second arm are hollow;
    wherein the drive motor is hollow;
    wherein the connection base has a hollow communicating portion that allows communication between a hollow portion of the reducer and a hollow portion of the first arm; and
    wherein the first arm, the second arm, the drive motor, and the connection base define a continuous hollow passage.

11. An industrial robot comprising:
    a first link mechanism including a fixed base, a connection base, a first arm, and a first link, the first arm is connected to the fixed base, the first link is connected to the fixed base and the connection base;
    a second link mechanism including the connection base, a movable base, a second arm, and a second link, the second arm is connected to the movable base, the second link is connected to the connection base and the movable base; and
    a harmonic drive gear mechanism between the first arm and the second arm, the harmonic drive gear mechanism including a body, an input shaft, a first output shaft, and a second output shaft, the body is connected to the first arm, the input shaft is connected to the drive motor, the first output shaft is configured to convert rotation of the input shaft and transmit the rotation to the connection base, the second output shaft is configured to convert rotation of the input shaft and transmit the rotation to the second arm.

12. The industrial robot according to claim 11, wherein the ratio of a reduction ratio of the first output shaft to the input shaft to a reduction ratio of the second output shaft to the input shaft is 2:1.

13. An industrial robot comprising:
    a first link mechanism including a fixed base, a connection base, a first arm, and a first link, the first arm is connected to the fixed base, the first link is connected to the fixed base and to the connection base;
    a second link mechanism including the connection base, a movable base, a second arm, and a second link, the second arm is connected to the movable base, the second link is connected to the connection base and the movable base; and a harmonic drive gear mechanism between the first arm and the second arm, the harmonic drive gear mechanism including a body, an input shaft, a first output shaft, and a second output shaft, the body is connected to the second arm, the input shaft is connected to a drive motor, the first output shaft is configured to convert rotation of the input shaft and transmit the rotation to the connection base, the second output shaft is configured to convert rotation of the input shaft and transmit the rotation to the first arm.

14. The industrial robot according to claim 13, wherein the ratio of a reduction ratio of the first output shaft to the input shaft to a reduction ratio of the second output shaft to the input shaft is 2:1.

* * * * *